United States Patent [19]
Bertram et al.

[11] 3,902,735
[45] Sept. 2, 1975

[54] HYDRAULIC COUNTERWEIGHT REMOVAL MECHANISM

[75] Inventors: August Herman Bertram, Aurora; Howard Bryant Austin, Oswego; Bobby Dale Griffith, Aurora, all of Ill.

[73] Assignee: Caterpillar Tractor Company, Peoria, Ill.

[22] Filed: June 3, 1974

[21] Appl. No.: 475,921

[52] U.S. Cl. .............................. 280/150 E; 212/49
[51] Int. Cl.[2] ........................................ B60R 11/00
[58] Field of Search ............... 280/150 E; 214/142; 212/49

[56] References Cited
UNITED STATES PATENTS
| | | | |
|---|---|---|---|
| 3,278,045 | 10/1966 | Potter | 212/49 |
| 3,595,410 | 7/1971 | Lemmon | 280/150 E |
| 3,795,330 | 3/1974 | Jorgesen | 214/142 |

*Primary Examiner*—Robert R. Song
*Attorney, Agent, or Firm*—Phillips, Moore, Weissenberger Lempio & Strabala

[57] ABSTRACT

A counterweight lift and suspension mechanism for raising and supporting a counterweight during its installation or removal from a counterbalanced vehicle is provided. The mechanism includes a pair of spaced-apart arm members pivotally connected to the vehicle and including a hydraulic jack connected thereto for elevationally positioning the counterweight relative to securing means on the vehicle. The support device eliminates external lift means and the requirement to accurately locate the counterweight with respect to the vehicle for mounting and is operative to free the counterweight for easier, more convenient removal from the vehicle.

8 Claims, 6 Drawing Figures

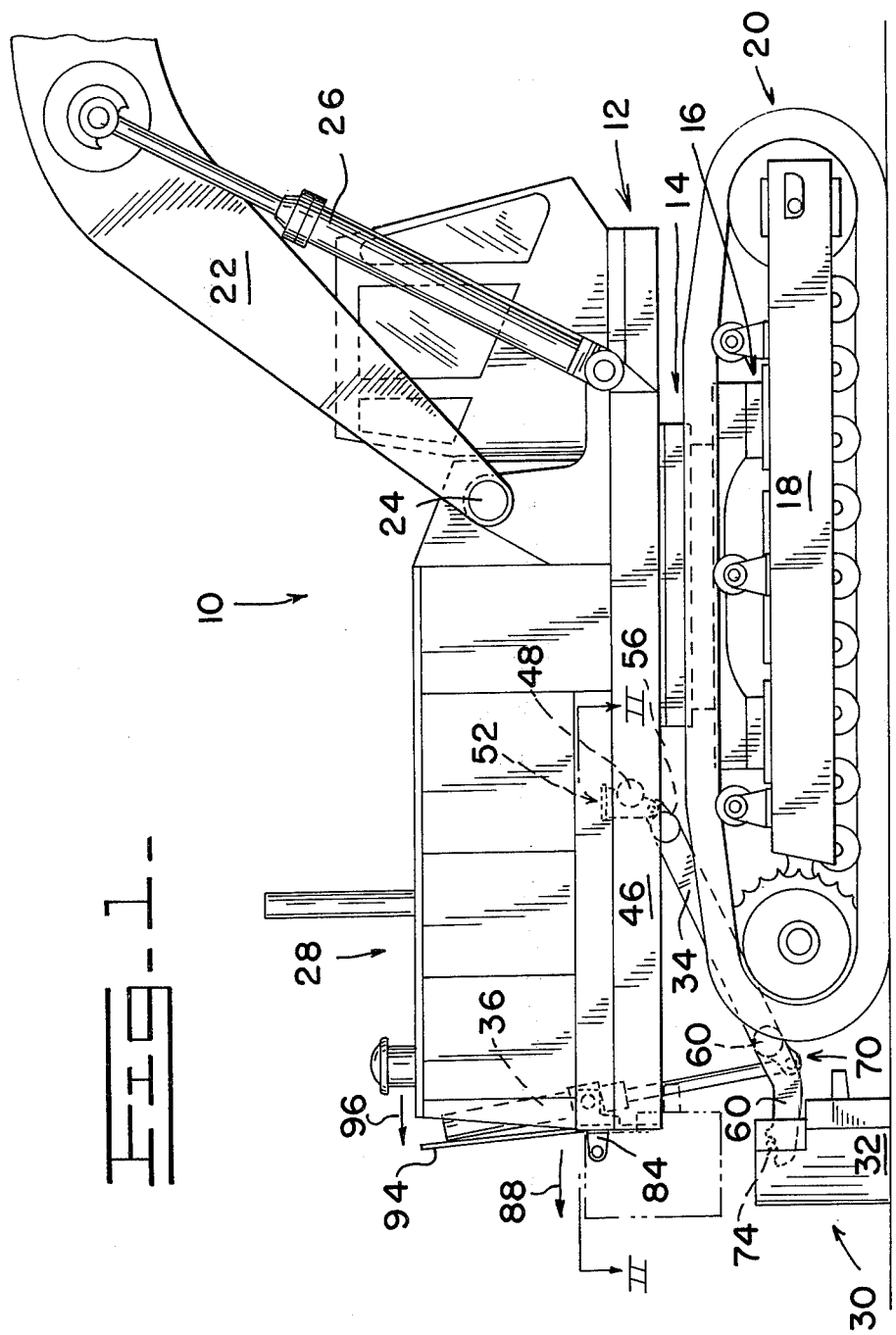

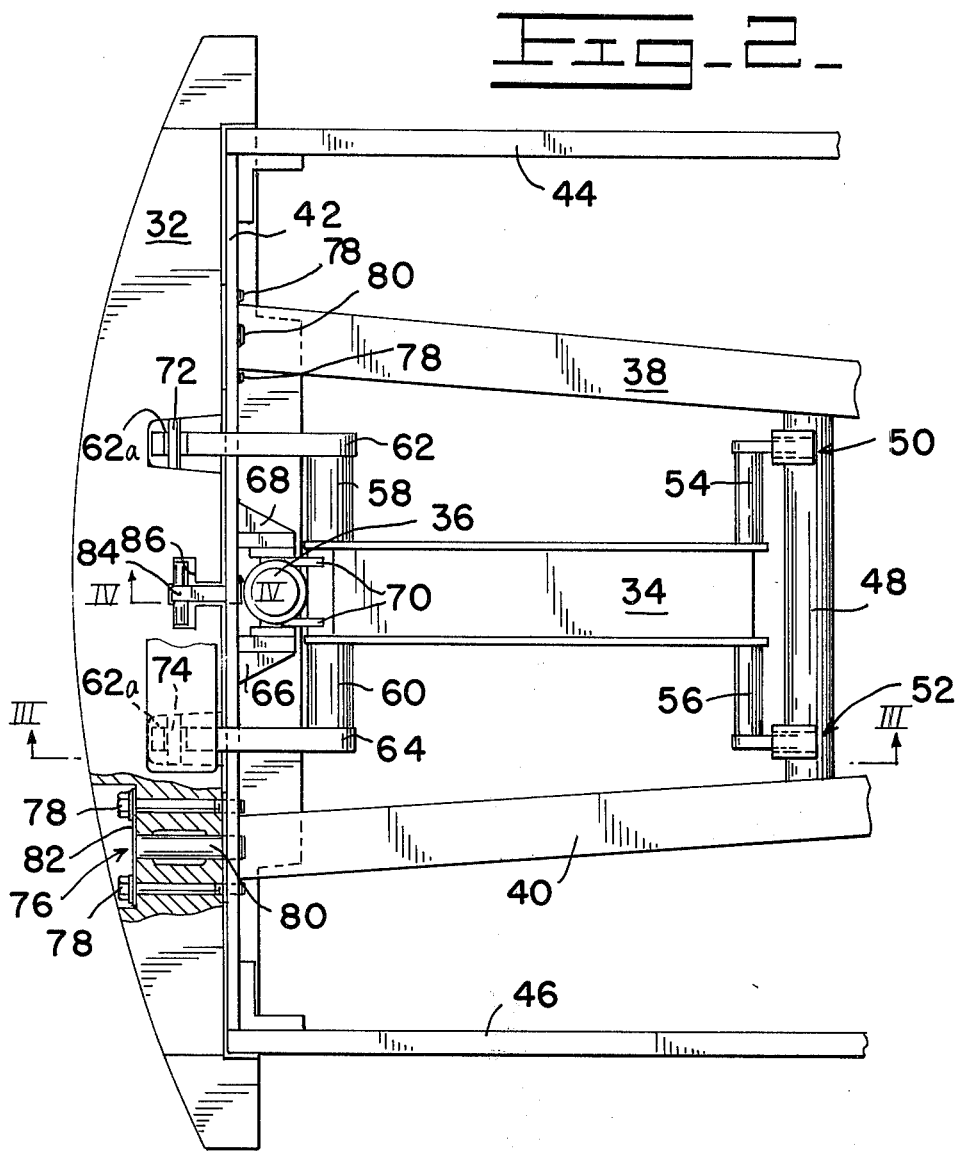
Fig_2_
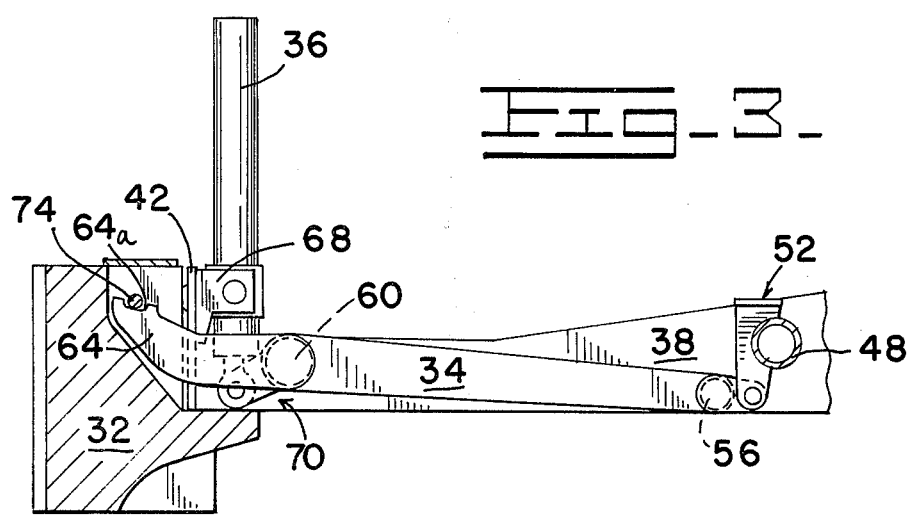
Fig_3_

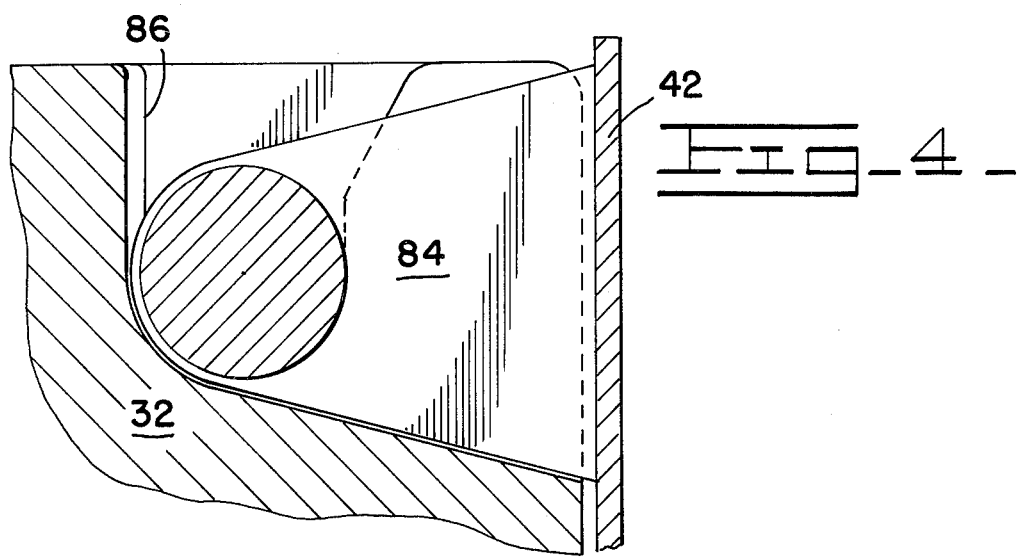
Fig_4_
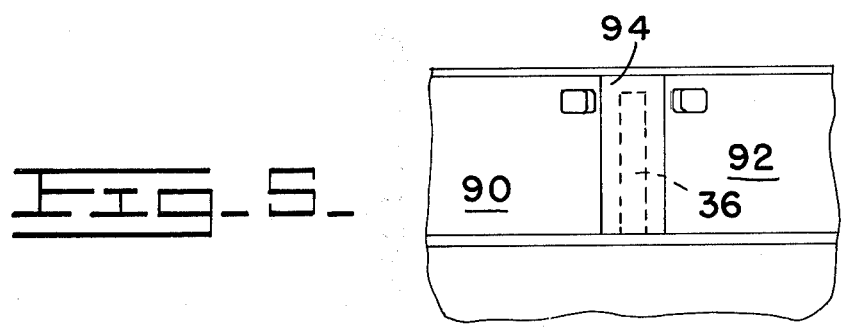
Fig_5_
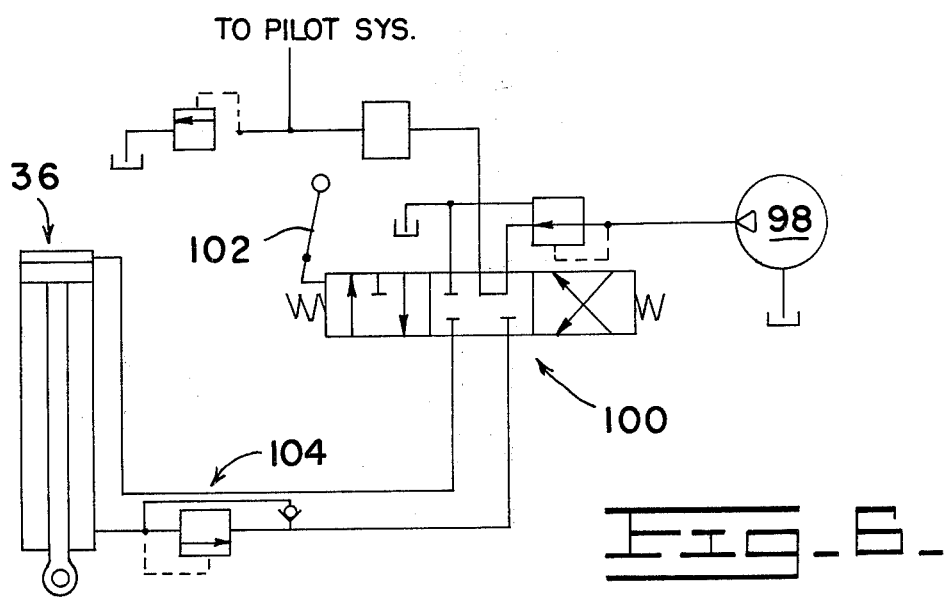
Fig_6_

HYDRAULIC COUNTERWEIGHT REMOVAL MECHANISM

BACKGROUND OF THE INVENTION

Construction and earth-moving vehicles, such as hydraulic excavators, loaders, and the like, frequently have a counterweight attached to the rear thereof to counterbalance the weight of the bucket or implement mounted on its front end, to enable the vehicle to lift heavier loads and to increase its stability during operation. The weight of the counterweight varies from a few hundred pounds on small vehicles to several tons on larger vehicles, and adds significantly to the total weight of the vehicle. When the vehicle is to be transported from one job site to another, it is usually desirable to remove the counterweight from the vehicle to permit the weight to be more evenly distributed on the transport vehicle, and in many cases the counterweight must be transported on a separate transport vehicle to satisfy the State regulations on gross vehicle loads.

Various devices and procedures for mounting and removing counterweights can be found in the prior art. However, such devices have not proven satisfactory, in that they usually involve undue cost, complexity, and inefficiency of operation. In some cases, particularly in the field, the counterweight is placed on one or more support blocks adjacent to the vehicle at the approximate desired elevation to permit its mounting on or removal from the vehicle with a minimum of manual manipulation.

However, variations in the ground surface often necessitate the placement of shims beneath the counterweight to support it in proper alignment with the vehicle during mounting and removal of the counterweight. The heavier counterweights are commonly supported by a separate crane, lift truck, or other lifting mechanism during mounting and removal operations. However, that procedure depends upon such additional lifting mechanism being available at the job sites which are sometimes widely spaced, and thus adds to the vehicle operating expense.

Other mounting and removal arrangements, as represented by U.S. Pat. No. 3,533,524, are attached directly to the vehicle. This type of arrangement does eliminate external and special lifting motors and linkages, but does not provide sufficient latitude in positioning the counterweight with respect to the vehicle, making its mounting and removal more difficult. Such arrangements also utilize rigid components pivotally connected to the vehicle such that they can swing only in a predetermined arc therefrom. Those arrangements require the vehicle to be aligned in precise registry with the counterweight to enable the components to be successfully assembled.

Other examples of the prior art are shown in the following U.S. patents: No. 2,674,378 issued Apr. 6, 1954 to Meyer et al.; No. 3,135,404 issued June 2, 1964 to Pilch; and No. 3,795,330 issued Mar. 5, 1974 to Jorgensen et al. and assigned to the assignee hereof.

SUMMARY OF THE INVENTION

Accordingly, it is an object of this invention to provide an improved counterweight mounting mechanism for a counterbalanced vehicle which does not require the utilization of additional lift mechanisms.

Another object of this invention is to provide an improved counterweight mounting mechanism which permits the counterweight removed from the vehicle to be placed directly on the ground surface.

Another object of this invention is to provide an improved counterweight mounting device which does not require the implement support linkage to be utilized for moving or handling the counterweight for its removal from the vehicle.

In accordance with a primary aspect of this invention, there is provided an improved counterweight mounting mechanism which enables a counterweight to be transferred between the ground surface and the vehicle and positioned relative to the vehicle with greater precision than is obtainable with conventional mounting procedures.

The invention comprises a pair of laterally spaced arm members pivotally connected to the back of the vehicle for supporting and accurately elevationally positioning the counterweight relative to the vehicle for ease of attachment and to free its weight for easier detachment from the vehicle.

Other objects and advantages of the present invention will become more readily apparent upon reference to the accompanying drawings and following description.

BRIEF DESCRIPTION OF THE DRAWINGS

FIG. 1 is a side elevational view of a hydraulic excavator employing a counterweight mounting mechanism in accordance with the present invention;

FIG. 2 is a view taken generally along lines II—II of FIG. 1;

FIG. 3 is a view taken generally along lines III—III of FIG. 2;

FIG. 4 is an enlarged view of the counterweight attachment device enlarged from that shown in FIG. 3;

FIG. 5 is a partial view showing the doors to the engine compartment and location of the hydraulic lift cylinder;

FIG. 6 is a schematic layout of a hydraulic circuit for the present invention.

DETAILED DESCRIPTION OF PREFERRED EMBODIMENT

Referring now to FIG. 1, there is illustrated an excavator generally indicated by the numeral 10 which includes an upper structure 12 mounted for rotation about a vertical axis by means of a swing mechanism indicated generally at 14 on a lower frame structure 16. The lower frame structure 16 is in turn mounted on a pair of laterally spaced track roller frames indicated generally at 18 (one shown) encompassed by an endless track assembly 20. A boom 22 is pivotally mounted near one end of the upper frame structure 12 at 24 and is raised and lowered by a pair of lift cylinders 26. An engine and other required components, such as hydraulic pumps and valves, are mounted within an enclosure 28 on the aft portion of the platform 12. The boom 22, of course, will have the usual load-handling implement such as a bucket, hook or the like, at its outer end.

A counterweight assembly generally designated by the numeral 30 includes a massive weight 32 detachably mounted to the opposite end of the vehicle from the load-supporting implement and boom 22. The counterweight mounting assembly includes a lift arm assembly 34 having means at one end, to be described later, for engaging the counterweight 32 and means at the other end for pivotally supporting or connecting the lift arm assembly to the vehicle frame and suitable hydraulic cylinder or jack 36 connected between the vehicle frame and the lift arm assembly for raising and lowering the arm assembly 34 and consequently the counterweight 32.

Turning now to FIG. 2, the upper structure 12 includes a frame comprising a pair of main rails 38 and 40 secured together at the outer end by means of an end plate 42 which in turn is secured to a pair of side plate members 44 and 46. This arrangement provides or supports suitable platform means on which the engine and other components enclosed within engine enclosure 28 are mounted. A tubular cross member 48 extends and is secured between the rails 38, 40 and also provides suitable support means for a pair of bracket members 50 and 52 for the pivotal connection of outwardly extending arms 54 and 56 of the lift arm assembly 34.

At the outer end of the main body portion of the lift arm assembly 34 there is provided a pair of outwardly extending arms 58 and 60, each of which includes and to which is secured at its outer end an arm 62 and 64 respectively. The arms 62 and 64 include means at the outer end in the form of depressions or hook means 62a and 64a, respectively, for engaging suitable means on the counterweight 32 for lifting the weight.

The lift cylinder 36 is pivotally mounted in a pair of brackets 66 and 68 which in turn are secured to end plate 42 of the vehicle frame. The lift cylinder 36 is further connected by means of suitable bracket means indicated at 70 to the lift arm assembly 34.

The construction of the lift arm assembly 34 with the laterally spaced pivot brackets 50 and 52 and the laterally spaced lift arms 62 and 64 provide a stable arrangement to prevent tilting or tipping of the weight 32 sideways when it is lifted into place. Thus the wide spacing of the pivot points and the wide spacing of the lift arms 62 and 64 enhance the stability of the lifting and mounting arrangement. The configuration as will be noted in FIG. 2 is substantially T-shaped at the pivot end and substantially Y-shaped at the hook end.

As best seen in FIGS. 2 and 3, the hooks or depressions 62a and 64a at the outer ends of the arms 62 and 64 receive or engage a pair of pins 72 and 74 mounted in a pair of cut-out portions in the counterweight 32. It will also be appreciated from these views that the length and pivotal location of lift arm assembly 34 is such that it extends downward at an angle of less than 45° when the weight 32 is resting on the ground. When the weight 32 is lifted to its secured position (FIG. 3) the arm 34 extends substantially horizontally.

Means for securing the counterweight to the frame of the vehicle comprises a bracket assembly 76, including a shear pin assembly having a shear pin 80 extending through aligned bores formed in the counterweight 32 and the plate 42 of the vehicle frame assembly. The pin 80 is secured to or includes a plate 82 through which extends a plurality of bolts 78 securing the plate and the pin 80 in position in the aligned bores. The securing means further includes a T-bar assembly 84 which includes a T-bar 84 mounted on frame member 42 and extending into a T-shaped slot 86 formed in the upper surface and extending downward into the counterweight 32. This T-bar assembly prevents the counterweight from tilting backwards when it is being assembled or secured in place on the vehicle. The shear pins 80 act to support the weight of the counterweight itself in a vertical position when the pressure in hydraulic jack 36 is relaxed to release the arms 62 and 64. The T-bar assembly is also illustrated in FIG. 4.

Turning now to FIG. 5, there is disclosed a partial rear view of the machine showing a pair of doors 90 and 92 which form a part of the engine enclosure 28. The doors may be opened to provide access to the engine and other components within the enclosure. Also illustrated is a panel section 94 behind which the hydraulic cylinder 36 is mounted. As best shown in FIG. 1, when the counterweight is lowered the cylinder 36 will rotate in the direction of arrow 96 about the pivot formed by the brackets 70. The panel section 94 is mounted by a spring-loaded hinge means so as to open and allow cylinder 36 to rotate about pivot brackets 66 and 68, but will close and completely enclose the cylinder 36 when the counterweight is in place.

Due to the infrequent use of the power cylinder 36, fluid for operation of this cylinder may be tapped off practically any source available on the vehicle, such as the pilot system. As best seen in FIG. 6, a schematic layout of a preferred circuit for the system is shown. The circuit includes a suitable source of hydraulic fluid such as a pump 98 supplying pressurized fluid in the usual manner to a selector valve 100 which is operatively controlled by means of a control lever 102 to direct fluid by suitable control lines to the hydraulic motor or jack 36. A suitable pilot-operated counterbalance valve 104 to check free flow in one direction but blocked in the opposite direction until a certain pressure is reached is provided in the circuit to prevent the counterweight from dropping down accidentally.

While this invention has been described in application to a hydraulic excavator, it is to be understood that it may be applied to numerous other vehicles requiring counterbalancing, such as loaders, cranes, pipe-layers and the like. Moreover, it is to be understood that numerous changes and modifications may be made in the illustrated embodiment without departing from the spirit and scope of the invention as defined in the appended claims.

We claim:

1. A counterweight mounting assembly for a counterbalanced vehicle having a frame with opposite ends, counterweight-securing means at one end, and implement-support linkage at the other end of the frame capable of lifting large loads capable of tilting said vehicle, said counterweight mounting assembly comprising:
   a lift arm including a central body member pivotally secured by pivot means at one end to said vehicle frame and including hook means comprising a pair of spaced-apart arms secured to and extending from opposite sides of said central body member at the other end for engaging a counterweight;
   a hydraulically operated lift cylinder secured between said vehicle frame and said lift arm to pivot said arm around said pivot means;
   a counterweight having hook-receiving means for receiving said hook means; and
   spaced bracket means for securing said counterweight to said frame.

2. The mounting assembly of claim 1 wherein said hook-receiving means comprises a pair of spaced recesses formed in said counterweight and a pin extending across each of said recesses for receiving said hook.

3. The mounting assembly of claim 2 wherein said bracket means includes aligned bores formed in said weight and in said vehicle frame; and a shear pin extending into said bores.

4. The mounting assembly of claim 3 wherein said bracket means includes a T-slot formed in said weight; and a T-bar secured to the frame of said vehicle engages said slot when said weight is lifted into position to be secured to said vehicle.

5. In combination a counterbalanced vehicle having a frame with opposite ends, counterweight means and mounting assembly at one end, and implement-support linkage at the other end of the frame capable of lifting large loads capable of tilting said vehicle, said counterweight mounting assembly comprising:

a lift arm including a central body member pivotally secured by pivot means at one end to said vehicle frame and including hook means comprising a pair of spaced-apart arms secured to and extending from opposite sides of said central body member at the other end for engaging said counterweight means;

a hydraulically operated lift cylinder secured between said vehicle frame and said lift arm to pivot said arm around said pivot means;

said counterweight means including hook-receiving means for receiving said hook means; and spaced bracket means for securing said counterweight to said frame.

6. The combination of claim 5 wherein said hook-receiving means comprises a pair of spaced recesses formed in said counterweight and a pin extending across each of said recesses for receiving said hook.

7. The mounting assembly of claim 6 wherein said bracket means includes aligned bores formed in said counterweight means and in said vehicle frame; and a shear pin extending into said bores.

8. The mounting assembly of claim 7 wherein said bracket means includes a T-slot formed in said weight; and a T-bar secured to the frame of said vehicle for engaging said slot when said weight is lifted into position to be secured to said vehicle.

* * * * *